April 2, 1929.  C. B. LAX  1,707,865
RADIO SCHEDULE INDICATOR
Filed April 21, 1928   2 Sheets-Sheet 1
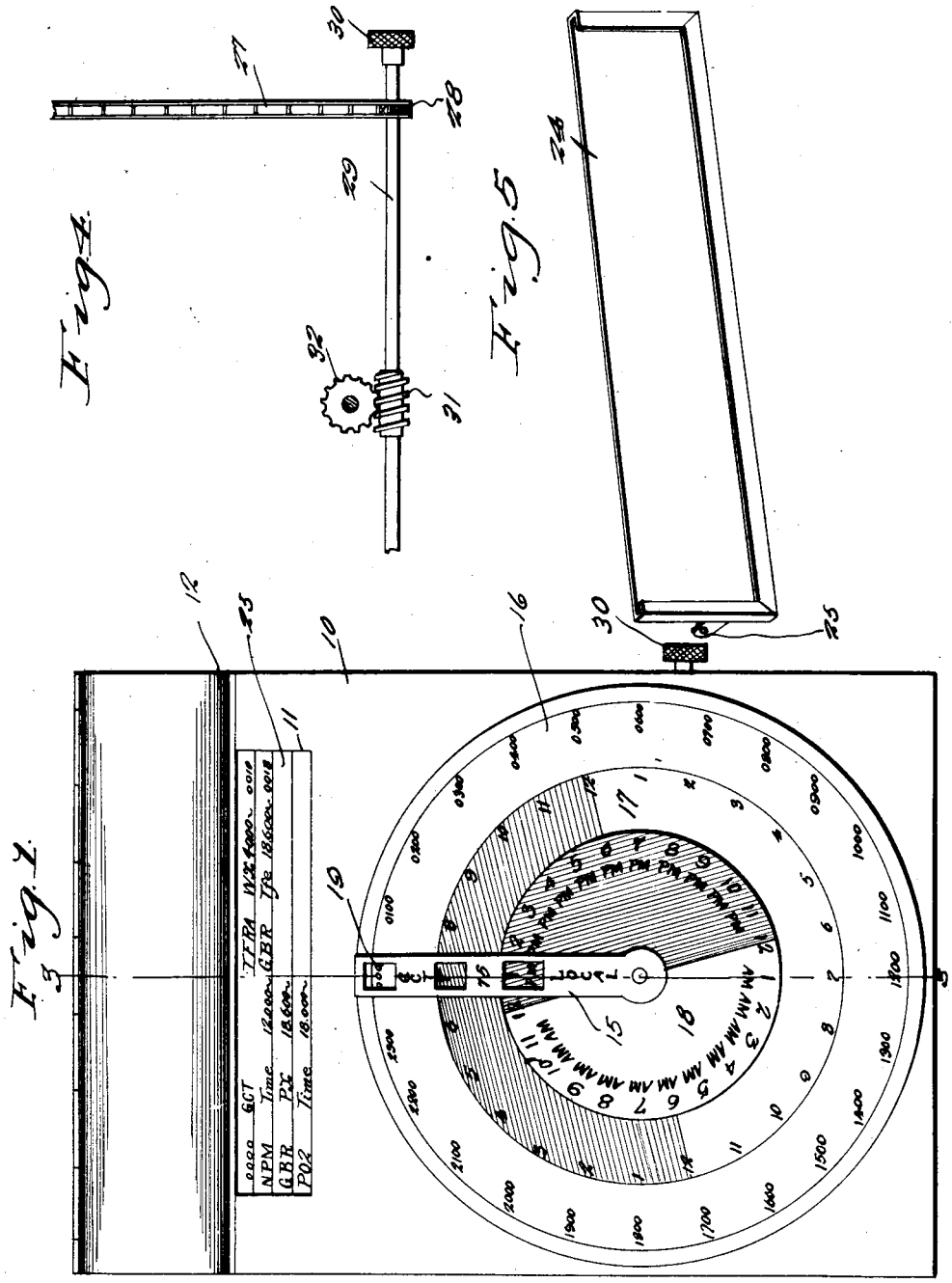

April 2, 1929.  C. B. LAX  1,707,865
RADIO SCHEDULE INDICATOR
Filed April 21, 1928  2 Sheets-Sheet 2
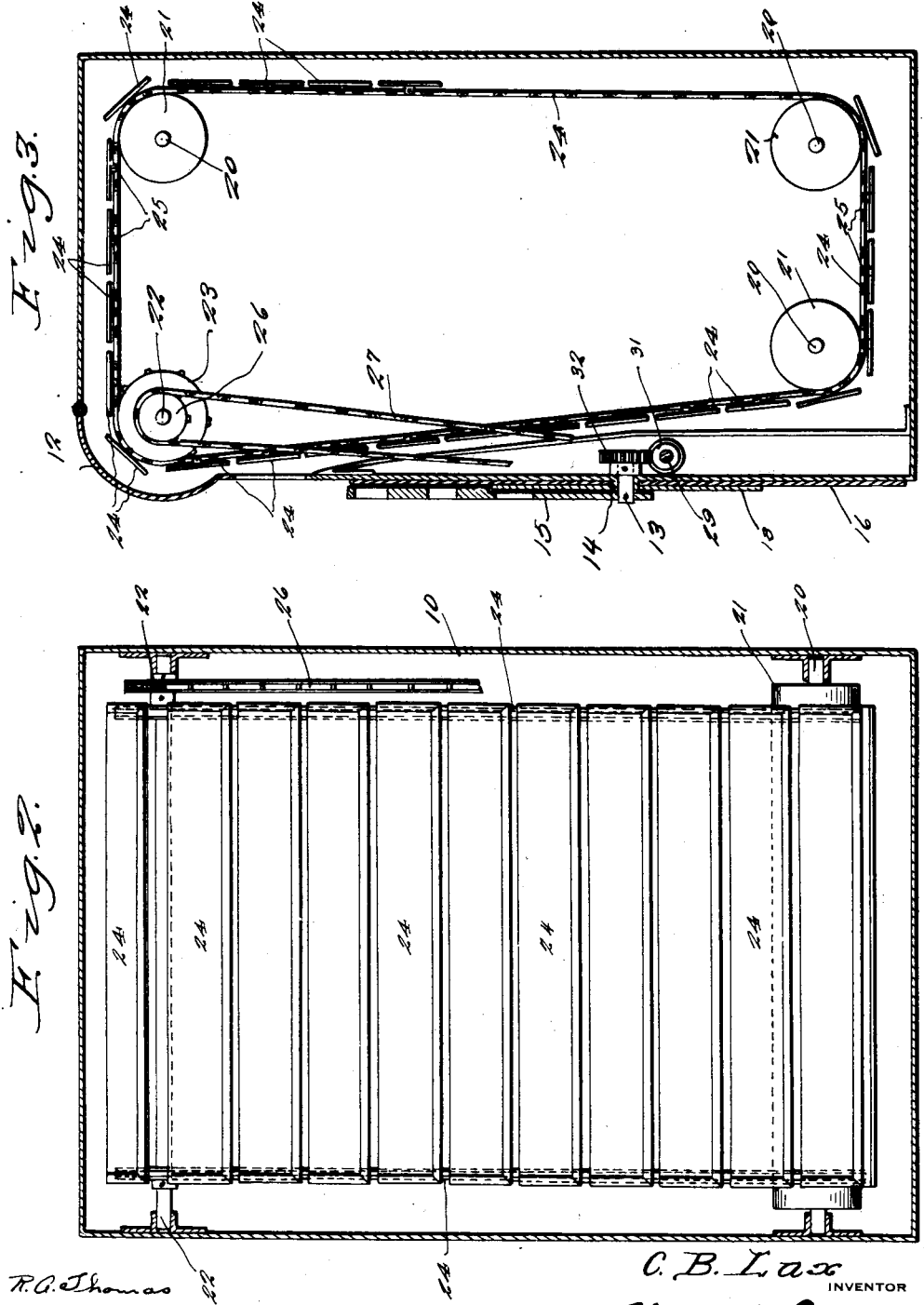

Patented Apr. 2, 1929.

1,707,865

UNITED STATES PATENT OFFICE.

CHARLES BERNARD LAX, OF NEW YORK, N. Y.

RADIO SCHEDULE INDICATOR.

Application filed April 21, 1928. Serial No. 271,881.

This invention relates to schedule indicating devices, an object being to provide means for indicating scheduled events occurring at a predetermined time either at or in advance of such time, and to indicate relative times in different localities, such as local, eastern, Greenwich time, etc., so that events occurring at such times may be indicated as well as the time of such occurrences at different places, the invention being especially useful as a radio schedule indicator.

With the above and other objects in view, the invention further includes the following novel features and details of construction, to be hereinafter more fully described, illustrated in the accompanying drawings and pointed out in the appended claims.

In the drawings:—

Figure 1 is an elevation of the invention.
Figure 2 is a vertical sectional view.
Figure 3 is a section on the line 3—3 of Figure 1.
Figure 4 is a fragmentary view illustrating the common operating means for the pointer and indicia bearing members.
Figure 5 is a detail perspective view of a holder for one of the indicia bearing members or cards.

Referring to the drawings in detail wherein like characters of reference denote corresponding parts, the reference character 10 indicates a housing which is provided with a sight opening 11 above which is a hingedly mounted door 12, whereby access may be obtained to the interior of the housing.

Mounted upon a short shaft 13 which is rotatable in a bearing 14 carried by the front face of the housing is a pointer 15, and located beneath this pointer and arranged concentrically with the shaft 13 are dials 16, 17 and 18. The dial 16 may form a part of the front wall of the casing with the dials 17 and 18 positioned thereon, the dials 16 and 17 being stationary while the dial 18 may be rotatably adjusted.

The dial 16 contains indicia indicating Greenwich meridian time and the dial 17 contains indicia indicating eastern standard time, while the dial 18 contains indicia indicating local time. As this last mentioned dial is adjustable, it may be adjustably positioned each day, or as often as desired in accordance with the hours that local time is in advance of or behind Greenwich time. The dials 17 and 18 have shaped portions so as to distinguish between a. m. and and p. m.

The shaded portions of course indicate the post meridian time. The pointer 15 is provided with openings 19 through which indicia upon the dials may be seen.

Mounted for rotation within the housing are shafts 20 which have rollers 21 mounted thereon, and a shaft 22. This shaft carries spaced sprockets 23 which engage chains 24, the latter also passing around the rollers. The chains have pivotally connected thereto opposite ends of holders 24 and for this purpose, the holders are provided with ears 25 for connection with the chains. The chains thus support the holders while the latter act to space the chains. The holders are adapted to receive indicia bearing members or cards 25 which contain indicia such as station call letters and other indicia relating to broadcasting stations.

The cards 25 are adapted to be brought into position within the sight opening 11 and for this purpose the shaft 22 carries a sprocket 26 which is driven by a chain 27 and a sprocket 28, the latter being mounted upon a drive shaft 29. The shaft 29 extends through the housing and is provided with an operating knob 30.

Also mounted upon the shaft 29 is a worm 31 which engages a worm gear 32 fast upon the stub shaft 13.

It will be seen from the foregoing description and accompanying drawings that by rotating the shaft 29, the pointer 15 will be rotated around the dials 16, 17 and 18 so that the pointer may be brought into a desired position to indicate local time, relative eastern standard time and relative Greenwich time. In addition, movement will be imparted to the chains 24 so that the particular card containing indicia of the broadcasting stations operating at the time indicated by the pointer, will be brought into position within the sight opening 11 so as to indicate the various schedules with call letters etc. transmitted at that time of day.

The invention also provides a rapid method of estimating Greenwich time and eastern standard time with relation to local time and may be used either on shipboard or shore. On shipboard, the time will of course change with the ship's position. The invention is also useful in connection with the conduct of a radio watch on board ship. With different dials it will be possible to arrange the indicator so as to be useful for experimental radio amateurs in keeping various schedules.

It will be also useful as a memorandum device to indicate certain business arrangements or engagements and the time of their occurrence. It is also easy to read from the dials the local time of the occurrence of events in other localities and the occurrence of future events.

The invention is susceptible of various changes in its form, proportions and minor details of construction and the right is herein reserved to make such changes as properly fall within the scope of the appended claims.

Having described the invention what is claimed is:—

1. In a schedule indicator, a casing having a sight opening therein, a plurality of dials arranged upon the casing and having indicia thereon to indicate times at different places, a pointer movable over the dials to indicate the relative times at such places, a plurality of indicia bearing members movable within the casing behind the sight opening, and means to simultaneously move the indicator and indicia carrying members.

2. In a schedule indicator, a casing having a sight opening therein, a plurality of dials arranged upon the casing and having indicia thereon to indicate times at different places, a pointer movable over the dials to indicate the relative times at such places, a plurality of indicia bearing members movable within the casing behind the sight opening, means to simultaneously move the indicator and indicia carrying members and means included in said moving means to bring into position within the sight opening an indicia bearing member relating to the time indicated upon the dials.

3. In a schedule indicator, a casing having a sight opening therein, a plurality of dials arranged upon the casing and having indicia thereon to indicate times at different places, a pointer movable over the dials to indicate the relative times at such places, a plurality of indicia bearing members movable within the casing behind the sight opening, means to simultaneously move the indicator and indicia carrying members and means to adjust one of the dials relative to the remaining dials.

4. In a schedule indicator, a casing having a sight opening therein, a plurality of concentrically arranged dials having indicia thereon to indicate times at different places, a pointer mounted concentrically of and movable over the dials to indicate the relative times at such places, a plurality of indicia bearing members movable within the casing behind the sight opening, and means to simultaneously move the indicator and indicia carrying members.

5. In a schedule indicator, a casing having a sight opening therein, a plurality of dials arranged upon the casing and having indicia thereon to indicate times at different places, a pointer movable over the dials to indicate the relative times at such places, spaced parallel endless chains mounted for movement within the casing, indicia carrying members supported by said chains and adapted to be brought into position within the sight opening, means to mount the chains for operation, means to rotate the pointer, and operating means common to both the chain operating means and the pointer rotating means.

6. In a radio schedule indicator, a casing having a sight opening therein, a plurality of dials mounted upon the casing and having indicia thereon to indicate times at different places, a pointer movable over the dials to indicate the relative times at such places, movable means arranged within the casing and having indicia thereon relating to different broadcasting stations, means to adjustably position the pointer, and means controlled by the pointer adjusting means to bring into position within the sight opening indicia relating to the particular broadcasting stations which operate at the indicated times.

In testimony whereof I affix my signature.

CHARLES BERNARD LAX.